Patented July 3, 1934

1,965,537

UNITED STATES PATENT OFFICE 1,965,537

MIXTURE OF VAT DYESTUFFS

Roland Rüsch, Opladen, Germany, assignor to General Aniline Works, Inc., New York, N. Y., a corporation of Delaware No Drawing. Application August 19, 1933, Serial No. 685,963. In Germany August 24, 1932

6 Claims. (Cl. 8—5)

The present invention relates to a process of producing dyeings fast to washing and keir boiling with dibenzanthrone and dyestuff mixtures producing such dyeings.

The dyeings and prints obtained with dibenzanthrone certainly have excellent fastness properties, but they do not meet the highest requirements as regards fastness to washing and keir boiling.

I have now found that black dyeings of substantially improved fastness to washing and keir boiling are obtained with dibenzanthrone by employing it in conjunction with the vat dyestuff obtainable by the process described in Example 2 of the German Patent No. 262,788. The said process substantially consists in acting on α-pentaanthrimide with aluminium chloride. If so much of the latter dyestuff component is employed that black dyeings are obtained, the effect of improved fastness to washing and keir boiling becomes evident. The exact proportion in which the two components are to be used inter alia depends on the properties, in particular the purity, of the components. In all cases, however, dyestuff mixtures containing in each 100 parts of the two components from about 45 to about 70 parts of the dyestuff obtainable according to Example 2 of the German Patent No. 262,788, the balance being dibenzanthrone, will give satisfactory results.

Dyeing with the said dyestuff mixtures may be effected for example by employing ready-made mixtures which are dyed from the vat in the usual manner. The mixtures may also be formed within the dyebath. Finally, the fabric or goods to be dyed may be first dyed or printed with one of the said components of the mixture the other component then being applied to this dyeing or print.

The dyestuff mixtures according to this invention yield dyeings and prints of extremely good fastness. The shade of color or the dyeings obtainable with the mixtures may be varied by the co-employment of other suitable vat dyestuffs such as Indanthrene yellow GF (Schultz, Farbstofftabellen, 7th Ed., 1931, vol. I, No. 1286), Indanthrene golden orange G (Colour Index 1924, No. 1096), Indanthrene orange RRT (Schultz, Farbstofftabellen 7th Ed., 1932, vol. 2, page 131), Indanthrene green BB (Colour Index 1924, No. 1116), Indanthrene brilliant green GG (Schultz, Farbstofftabellen, 7th Ed., 1931, vol. 1, No. 1269), Indanthrene brilliant green FFB (Schultz, Farbstofftabellen, 7th Ed., 1932, vol. II, page 128) and Indanthrene olive green B (Schultz, Farbstofftabellen, 7th Ed., 1932, vol. II, page 131). The proportions of shading colors which may be employed vary according to the proportions of the other components used and to the shades desired. By way of example in the following table the proportions are given, up to which different shading colors may be added to a mixture of 43 parts by weight of the dyestuff obtainable according to Example 2 of the German specification No. 262,788 and 57 parts by weight of pure dibenzanthrone.

| Dyestuff | May be added in amounts of at the most (parts by weight) |
| --- | --- |
| Indanthrene yellow GF | 20 to 25 |
| Indanthrene golden orange G | 40 |
| Indanthrene orange RRT | 20 |
| Indanthrene green BB | 30 to 40 |
| Indanthrene brilliant green FFB | 20 |
| Indanthrene brilliant green B | 20 |
| Indanthrene brilliant green GG | 20 |
| Indanthrene olive green B | 40 |
| Indanthrene olive T | 30 to 40 |

The following example will further illustrate the nature of this invention but the invention is not restricted to this example. The parts are by weight.

*Example*

Cotton is dyed from the vat with a mixture of 1 part of the dyestuff obtainable according to Example 2 of the said German specification No. 262,788 and 1 part of pure dibenzanthrone. Grey to black dyeings of excellent fastness to washing and keir boiling are obtained. The relative proportions of the two components of the mixture may be varied within wide limits. Mixtures containing down to about 45 per cent of the dyestuff according to German specification No. 262,788, Example 2, have strongly improved fastness properties. Of course increasing percentages of the said dyestuff exert stronger improving effects. The proportion of dibenzanthrone may be lowered down to about 30 per cent without an undesired change in the shade of the dyeings.

What I claim is:—

1. The process of producing black dyeings fast to washing and keir boiling, which comprises dyeing cotton with dibenzanthrone in conjunction with the dyestuff obtainable by the action of aluminium chloride on α-pentaanthrimide.

2. The process of producing black dyeings fast to washing and keir boiling, which comprises dyeing cotton with dibenzanthrone in conjunction with the dyestuff obtainable by the action of aluminium chloride on α-pentaanthrimide the said dyestuffs being employed in the proportion of from about 45 to about 70 parts by weight of the latter in each 100 parts by weight of the two components the balance being dibenzanthrone.

3. Dyestuff mixtures dyeing cotton black shades fast to washing and keir boiling comprising dibenzanthrone and the vat dyestuff obtainable by the action of aluminium chloride on α-pentaanthrimide.

4. Dyestuff mixtures dyeing cotton black shades fast to washing and keir boiling comprising dibenzanthrone and the vat dyestuff obtainable by the action of aluminium chloride on α-pentaanthrimide the said dyestuffs being employed in the proportion of from about 45 to about 70 parts by weight of the latter in each 100 parts by weight of the two components the balance being dibenzanthrone.

5. The dyestuff mixture dyeing cotton black shades fast to washing and keir boiling comprising about equal parts by weight of dibenzanthrone and the vat dyestuff obtainable by the action of aluminium chloride on α-pentaanthrimide.

6. The dyestuff mixture dyeing cotton black shades fast to washing and keir boiling comprising about 57 parts by weight of dibenzanthrone and about 43 parts by weight of the vat dyestuff obtainable by the action of aluminium chloride on α-pentaanthrimide in each 100 parts by weight of the two components.

ROLAND RÜSCH.